(12) United States Patent
Westelaken

(10) Patent No.: US 8,469,846 B2
(45) Date of Patent: *Jun. 25, 2013

(54) V-RIBBED BELT HAVING AN OUTER SURFACE WITH IMPROVED COEFFICIENT OF FRICTION

(75) Inventor: Paul M. Westelaken, Aiken, SC (US)

(73) Assignee: Dayco IP Holdings, LLC, Springfield, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 13/459,730

(22) Filed: Apr. 30, 2012

(65) Prior Publication Data

US 2012/0214630 A1 Aug. 23, 2012

Related U.S. Application Data

(63) Continuation of application No. 12/391,505, filed on Feb. 24, 2009, now Pat. No. 8,192,315.

(51) Int. Cl.
*F16G 5/20* (2006.01)

(52) U.S. Cl.
USPC .......................... 474/238; 474/251

(58) Field of Classification Search
USPC .......................... 474/139, 237, 238, 265, 251
See application file for complete search history.

(56) References Cited

U.S. PATENT DOCUMENTS 4,773,895 A * 9/1988 Takami et al. ................ 474/238
8,192,315 B2 * 6/2012 Westelaken ................... 474/238

* cited by examiner

*Primary Examiner* — William E Dondero
(74) *Attorney, Agent, or Firm* — Thompson Hine LLP

(57) ABSTRACT

A V-ribbed belt for a mechanical power transmission. The V-ribbed belt comprises an outer back-side surface, an inner front-side surface, and a load-carrying section disposed between the front-side and back-side surfaces. The front-side surface includes a plurality of laterally spaced longitudinally extending v-ribs. The back-side surface includes a plurality of raised features that, when running on a flat-faced, back-side pulley, form a contact patch of about 20% to about 50% of that of a traditional flat-faced belt running on a flat-faced pulley. The reduced contact patch provides increased contact pressure which in turn provides an improved effective coefficient of friction between the belt and the pulley.

22 Claims, 5 Drawing Sheets

V-RIBBED BELT HAVING AN OUTER SURFACE WITH IMPROVED COEFFICIENT OF FRICTION

RELATED APPLICATIONS

This application is a continuation of U.S. application Ser. No. 12/391,505, filed Feb. 24, 2009.

BACKGROUND

This invention relates to power transmission belts and, more particularly, to an improved V-ribbed belt having an outer back-side surface with a high coefficient of friction for driving flat-faced back-side pulleys.

V-belts and V-ribbed belts are used in a wide range of environments. V-ribbed belts are preferred for their high power transmission capability, which is attributable to the large contact area between the ribs on the belt and the flank on the cooperating pulleys.

In operation, there is a tendency for V-belts and V-ribbed belts to emit noise; a common complaint, especially on automotive drives. Belt noise is predominately the result of pulley engagement and disengagement noise arising as the ribs on the belt enter into and exit from the pulley grooves or arising from excessive rotational slip of the pulley relative to the belt. Rotational slip occurs during rapid acceleration or deceleration of the drive such as is encountered during shifting, engine startup or engine shutdown or due to excessive loading or insufficient wrapping around the pulleys.

Previous attempts to reduce belt noise and reduce rotational slipping of back-side pulleys were successful for the drive systems of that time. However, current drive systems are increasingly incorporating pulleys on the back-side of the belt to drive accessories like fans, water pumps, air conditioners and the like. With these increased performance requirements on engines, the load on such accessories has increased beyond the current capabilities of existing serpentine belts. As such, improved V-ribbed belts are needed to drive back-side pulleys efficiently under such loads. The V-ribbed belt should also reduce noise and slippage

SUMMARY

In one aspect, disclosed are V-ribbed belts for a mechanical power transmission. The V-ribbed belt includes an inner front-side section having a plurality of laterally spaced longitudinally extending V-ribs, an outer back-side section for driving a flat-faced pulley, the outer back-side section comprising a plurality of raised features separated by low regions alternating therebetween and extending longitudinally along the length thereof, and a load-carrying section disposed between said back-side and said front-side sections and coextensive with both the back-side and front-side sections. The raised features and low regions of the outer back-side section are configured and arranged such that only the apex of the raised features are contactable with the flat-face of the flat-faced pulley. The raised features form a reduced contact patch with the back-side pulley that has an area about 20% to about 50% of the area of a full contact patch that would be formed between the back-side pulley and a flat-faced belt over the same length of engagement.

The uniqueness of the belt's outer back-side construction is that the coefficient of friction of the outer back-side increases over time in dry, dust conditions by about 1.4 to about 2.1 times its initial coefficient of friction measured when the belt is stopped and started. The coefficient of friction of the outer back-side also increases over time in dry, dust conditions by about 1.5 to about 2.7 times its initial coefficient of friction at 10% slip.

In another aspect, V-ribbed belts are disclosed that have an inner front-side section having a plurality of laterally spaced longitudinally extending V-ribs, an outer back-side section for driving a flat-faced pulley comprising a plurality of raised features that are configured to contact and frictionally engage a flat-faced pulley, and a load-carrying section disposed between said back-side and said front-side sections and coextensive with both the back-side and front-side sections. Here, the raised features extend longitudinally along the length of the belt and have heights of 0.1 mm to 1.0 mm.

The disclosed back-side section of the V-ribbed belt has an improved coefficient of friction which efficiently drives a flat-faced back-side pulley, which may be used to operate accessories in an engine. The back-side section with its raised features and low regions also reduces noise and provides a means to remove debris and fluids away from the back-side section to back-side pulley interface. Debris and fluids could lead to slippage of the belt against the pulley; and hence, the disclosed embodiments reduce slippage. Additionally, the disclosed back-side section has a long belt life and during that life maintains an effective coefficient of friction when against a flat-faces back-side pulley.

DETAILED DESCRIPTION

The preferred embodiments of the improved V-ribbed belt are described below with reference to the accompanying figures. While the various features of this invention are hereinafter illustrated and described with reference to the figures, it is to be understood that the invention is broader in scope and not limited to just those embodiments that are pictured.

Figure 1:
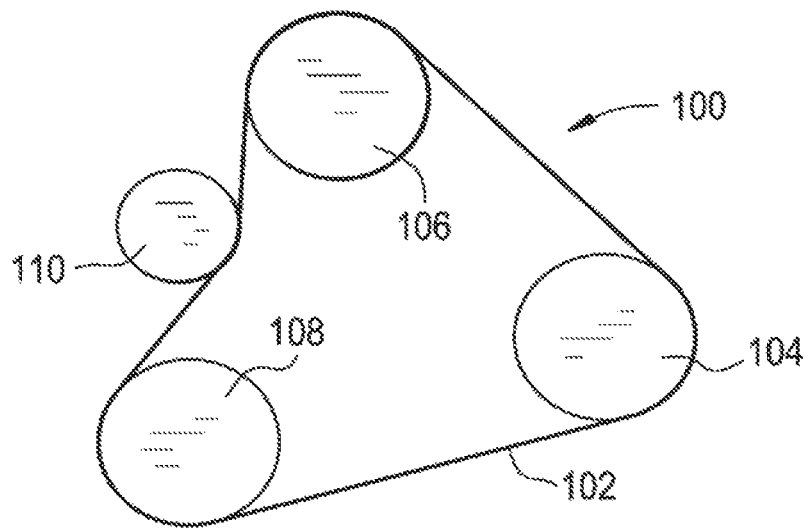
FIG. 1 is a schematic elevation illustrating a V-ribbed belt engaged with front-side and back-side pulleys.

Referring to FIG. 1, a serpentine belt drive system, generally designated 100, may include a V-ribbed belt 102, a front-side driver pulley 108, one or more driven front-side accessory pulleys 104,106, and one or more back-side pulleys 110. The drive system 100 depicted in FIG. 1 is only one example of a drive system configuration. Many alternate arrangements are known in the art and are suitable for use with the present invention.

Figure 2:
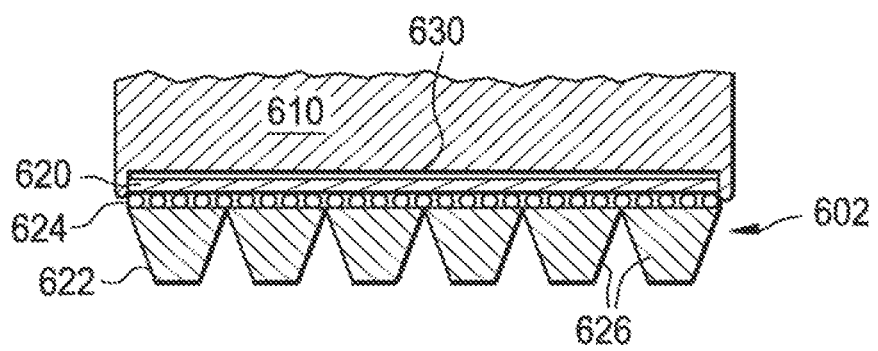
FIG. 2 is a cross-sectional view of a conventional flat backed V-ribbed belt engaged with a flat-faced back-side pulley.

FIG. 2 depicts, in cross-section, the engagement between a conventional V-ribbed belt 602 and a conventional back-side pulley 610. The conventional V-ribbed belt includes an inner front-side section 622 (sometimes referred to as a compression section) having a plurality of longitudinally extending V-ribs 626, a flat outer back-side section 620 (sometimes referred to as a tension section), and a load-carrying section 624 between the front-side and back-side sections. The conventional back-side pulley 610 is a flat-faced pulley with a smooth belt-receiving surface 630. As is well known, the back-side pulley 610 may engage with the V-ribbed belt 602 by extending or pushing into the path of the belt so that the belt wraps around some portion of the outer circumference of the pulley. Frictional contact between the pulley 610 and the belt 602 allows the belt to drive the pulley. Insufficient friction results in slippage and increased noise.

Figure 11:
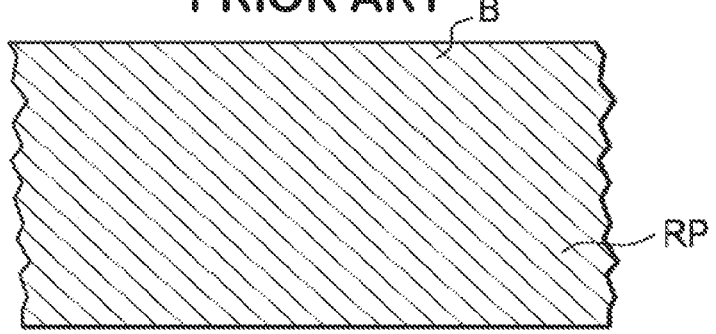
FIG. 11 is a schematic depiction of the contact patch formed between a flat-faced pulley and a flat-faced belt surface engaged with the pulley.

As schematically depicted in FIG. 11, the area of contact between the belt-receiving surface 630 of the conventional pulley and the back-side section 620 of the conventional belt, also referred to herein as the contact patch, is approximately rectangular when projected into a two-dimensional plane since both contacting surfaces are generally smooth. The size of the contact patch is approximated generally by the width of the flat back-side section 620 of the belt multiplied by the circumferential length over which the belt wraps around the outer belt-receiving surface 630 of the pulley. The coefficient of friction between the belt-receiving surface 630 of the back-side pulley 610 and the back-side section 620 of the belt 602 depends upon the materials used to form each of the contacting surfaces.

The improved V-ribbed belt of the present invention includes a modified outer back-side surface that produces a smaller contact patch than a flat-faced belt when engaged with a flat-faced back-side pulley. Unexpectedly, the reduced contact patch provides an increased effective coefficient of friction and therefore reduced slippage. The result is unexpected because it is not intuitive that reducing the area of contact between the belt and the pulley would result in a greater coefficient of friction or friction force to resist slippage. Nevertheless, the improved V-ribbed belt of the present invention exhibits a significantly increased coefficient of friction over similar flat-faced belts, even though the belt's modified pulley-contacting surface has less contact with the face of the pulley.

The modified back-side surfaces, described herein, include raised features that apparently provide concentrated, high pressure contact against the back-side pulley, which increases the effective coefficient of friction for the back-side of the belt and the pulley. The increased coefficient of friction is advantageous in that the back-side of the belt can drive a generally flat-faced back-side pulley with loads up to about 15 hp with low slippage, reduced noise, and long belt life with the high coefficient of friction maintained throughout.

Figure 3:
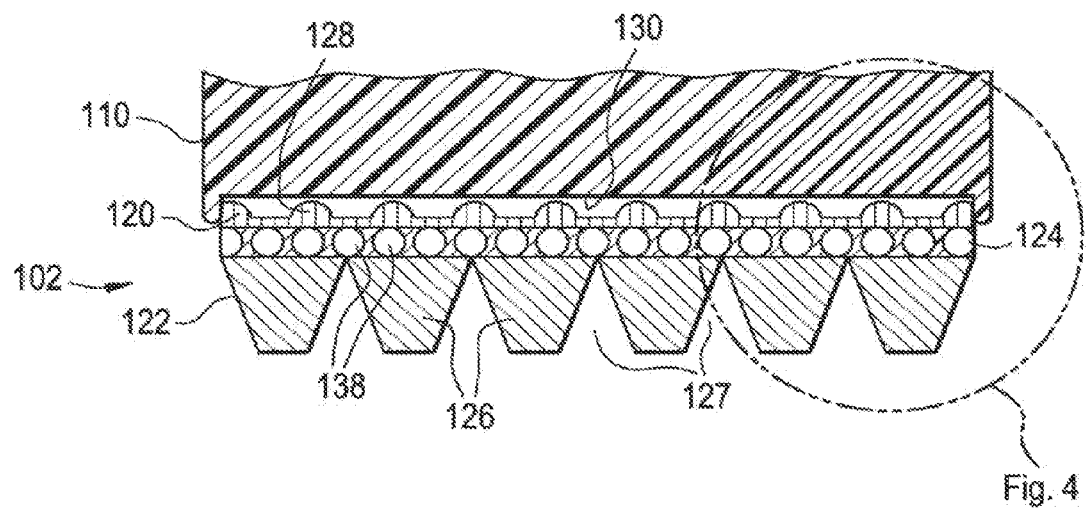
FIG. 3 is a cross-sectional view of a first embodiment of the improved V-ribbed belt engaged with a flat-faced back-side pulley.

Referring now to one embodiment shown in FIG. 3, an improved V-ribbed belt 102 is shown positioned with the outer back-side surface 128 of the belt against the belt-receiving surface 130 of the back-side pulley 110, which is generally flat. The V-ribbed belt 102 includes a back-side section 120, an inner front-side section 122, and a load-carrying section 124 positioned between the back-side and front-side sections, 122, 124. The load carrying section 124 may include load-carrying cords 138. The front-side section 122 includes laterally spaced longitudinally extending V-ribs 126 and V-shaped grooves 127 that may mesh with and be driven by a front-side pulley.

Figure 4:
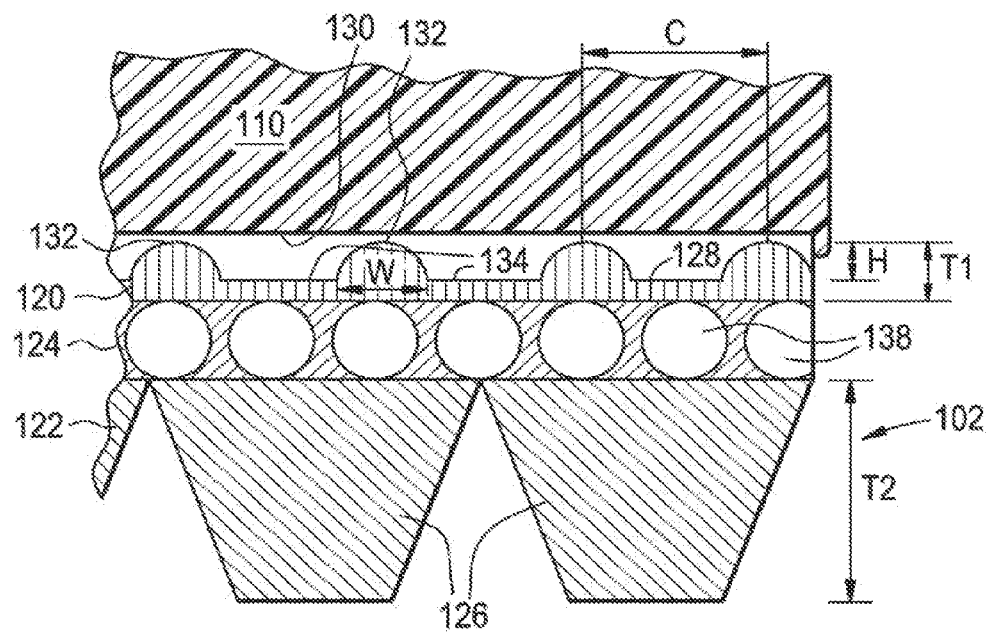
FIG. 4 is an enlarged fragmentary cross-sectional view of the improved V-ribbed belt of FIG. 3.

The embodiment shown in FIGS. 3 and 4 includes an improved back-side section 120 with raised features 132 that form a reduced contact patch when engaged with a flat-faced back-side pulley, similar to the manner in which the treads of a tire form a reduced contact patch with the road in comparison to a bald tire. The raised features 132 of this embodiment comprise a plurality of ribs that engage the flat belt-receiving surface 130. When viewed in cross-section across the lateral width of the belt as in FIG. 3, the ribs of this embodiment have curved tips that contact the flat-faced pulley at the apex of each rib. The ribs, separated by low regions 134, are laterally spaced across the width of the back-side of the belt and extend longitudinally along the length of the belt. The raised features 132, but not the low regions 132, contact the belt-receiving surface 130 of the generally flat back-side pulley 110 to drive the pulley. The low regions 132 are advantageous because they may act as channels for directing debris, dust or other contaminants, which may reduce the coefficient of friction, away from the contact patch over time.

Figure 10:
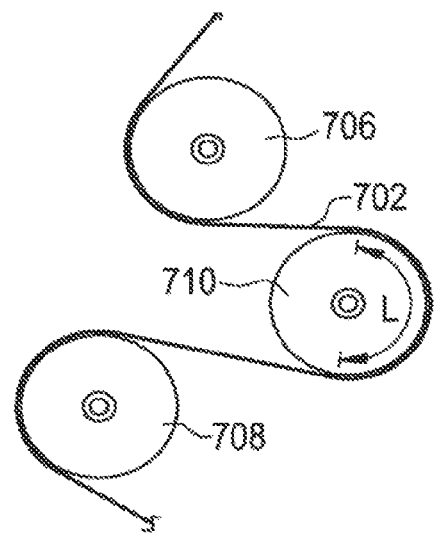
FIG. 10 is a side view of one embodiment of the improved V-ribbed belt engaged with a flat-faced back-side pulley.
Figure 12:
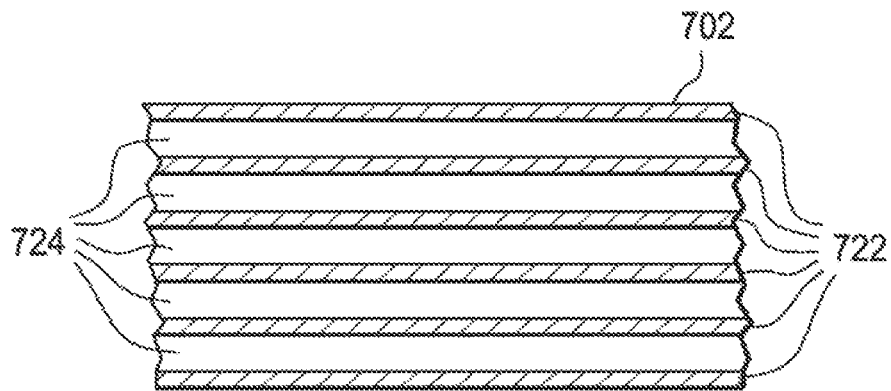
FIG. 12 is a schematic depiction of a contact patch formed between a flat-faced pulley and one embodiment of the improved belt having longitudinally extending raised features on the pulley-engaging surface of the belt.

FIG. 10 schematically depicts the back-side of the improved belt 702 engaged with a flat-faced back-side pulley 710 over an engagement length L. Front-side pulleys 706 and 708 are also in contact with the improved belt 702. In contrast to the rectangular contact patch RP produced by a conventional flat-faced belt B, which is schematically depicted in FIG. 11, the contact patch produced by the improved belt 702 over the same engagement length L is smaller in area and consists of a series of laterally spaced rows 722 separated by non-contact areas 724 as depicted in FIG. 12. In some embodiments the area of the reduced contact patch is about 20% to about 50% of the area of a contact patch that would be formed by a flat-faced belt when engaged with the flat-faced pulley over the same length of engagement. In other embodiments, the area of the contact patch is preferably about 20% to about 35% of the contact patch that would be formed between a flat-faced belt and flat-faced pulley.

The back-side section 120 of the improved belt is thin in comparison to the front-side V-ribbed section 122. The overall thickness T1 of the back-side section 120 may be less than half the thickness T2 of the front-side section 122. In some embodiments the thickness T1 of the back-side section 120 may be between about 0.76 mm and about 1.3 mm whereas the thickness T2 of the front-side section 122 may be between about 4.0 mm and about 6.3 mm. The V-ribs of the front-side section 122 may have a height between about 1.8 mm and about 2.7 mm. The raised features 132 may have a height H of about 0.1 mm to about 1.0 mm and a width W of about 0.2 mm to about 1.8 mm. In certain preferred embodiments the raised features 132 may have height of about 0.5 mm to about 1.0 mm. The pulley-contacting raised features 132 may also have a center-to-center distance C of about 0.4 mm to about 3.6 mm. The advantage to keeping the back-side section 120 including the raised features 132 relatively thin is that it preserves the flexibility of the V-ribbed belt, which can improve the longevity of the belt and the usefulness of the belt in various drive system configurations.

Figure 5:
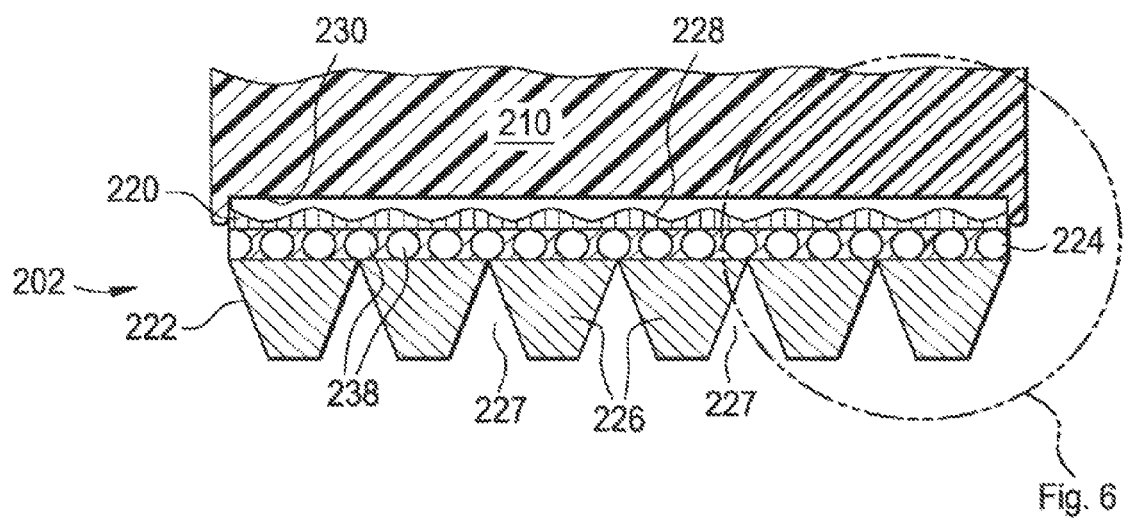
FIG. 5 is a cross-sectional view of a second embodiment of the improved V-ribbed belt engaged with a flat-faced back-side pulley.
Figure 6:
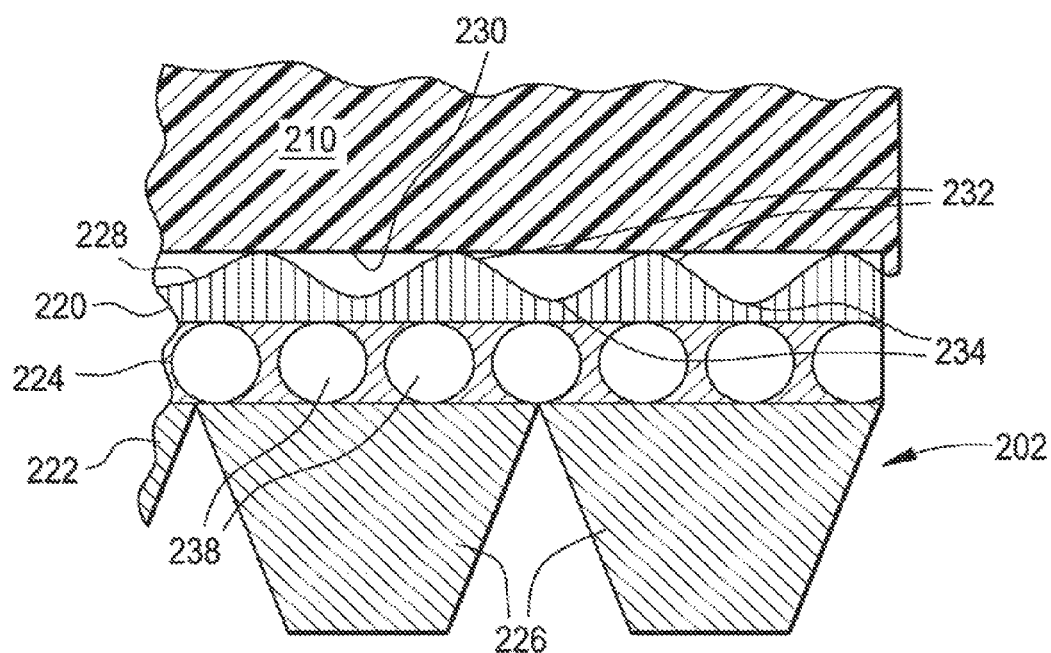
FIG. 6 is an enlarged fragmentary cross-sectional view of the improved V-ribbed belt of FIG. 5.

Referring now to FIGS. 5 and 6, a second embodiment of the improved V-ribbed belt 202 is shown positioned with the outer back-side surface 228 of the belt against the generally flat belt-receiving surface 230 of the back-side pulley 210. The V-ribbed belt 202 includes an outer back-side section 220, an inner front-side section 222, and a load-carrying section 224 positioned between the back-side and front-side sections, 222, 224. The front-side section 222 includes laterally spaced longitudinally extending V-ribs 226 and V-shaped grooves 227. The improved back-side section 220 includes a plurality of laterally spaced longitudinally extending raised features 232 that contact and frictionally engage the belt-receiving surface 230 of the back-side pulley 210. In this embodiment, the outer back-side surface 228 comprises undulating concave and convex regions that form the raised features 232. The raised features 232 may have heights, widths, and center-to-center spacing as described above for the first embodiment. The raised features 232 form a contact patch with the belt-receiving surface 230 of the pulley that approximates and is similar to the contact patch schematically depicted in FIG. 11.

The first and second embodiments shown in FIGS. 3-6 have generally curved or arcuate raised features, 132 and 232, which may be semi-circular, elliptical, sinusoidal, or the like. Curved pulley-contacting surfaces may be advantageous in more smoothly transitioning the back-side of the belt onto and off of the pulley's belt-receiving surface 130, 230, with less noise. Additionally, as is well known, the sharp corners of V-ribbed belts tend to be the points where cracking of the belt initiates. Therefore, the use of curved raised features 132, 232 and low regions 134, 234 that do not contact the pulley's belt-receiving surface may hinder or reduce cracking within the belt.

Figure 7:
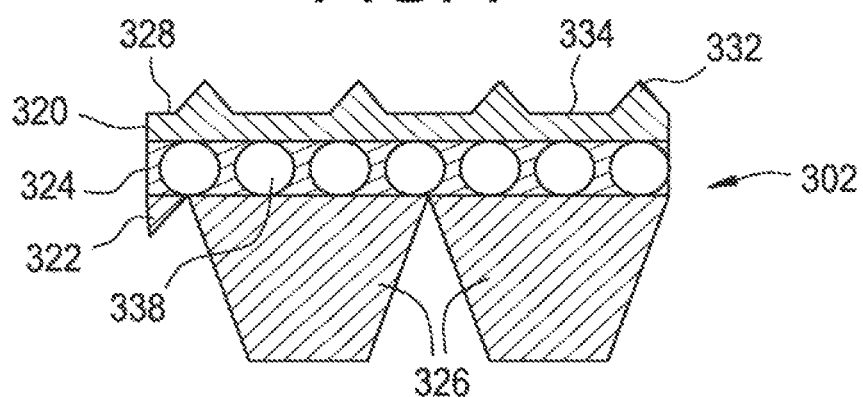
FIGS. 7-9 are enlarged fragmentary cross-sectional views of additional alternate embodiments of the improved V-ribbed belt.
Figure 8:
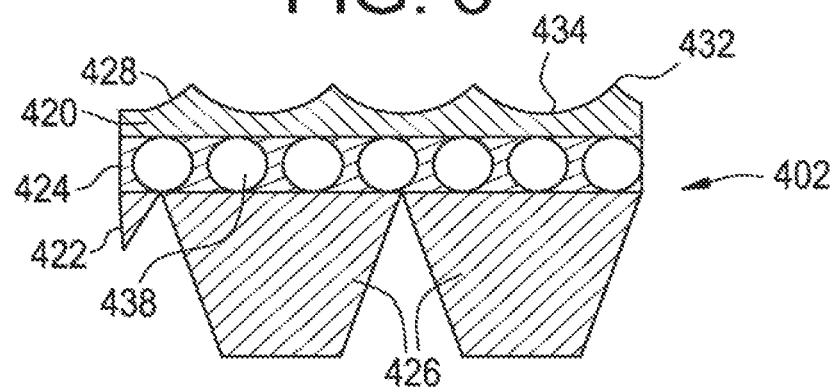
Figure 9:
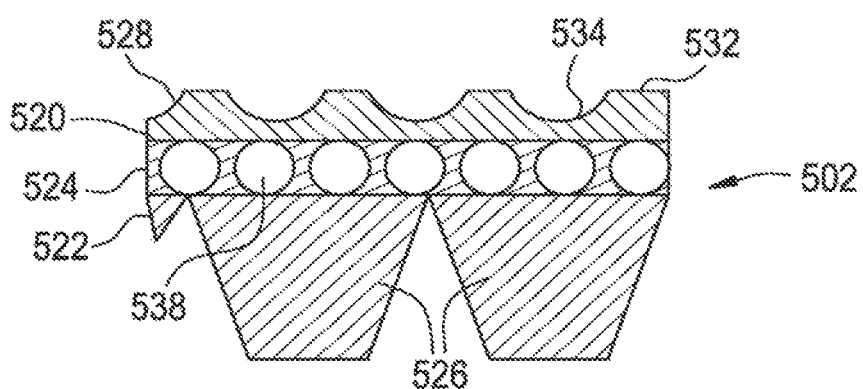

Even though arcuate raised features without sharp corners are advantageous, other configurations, such as rectangular, triangular, or combinations thereof, are also acceptable and included within the scope of the invention. FIGS. 7-9 show alternate embodiments of the improved V-ribbed belts 302, 402, and 502, respectively, where like components have similar numerical labels. Each of the V-ribbed belts 302, 402, 502 includes an outer back-side section 320, 420, 520, with a plurality of laterally spaced longitudinally extending raised features 332, 432, 532 for engaging the belt-receiving surface of a back-side pulley.

As shown in FIG. 7, the raised features 332 may be triangular ribs with generally flat low regions 334 alternating therebetween. As shown in FIG. 8, the raised features 432 may be generally triangular ribs with adjacent ribs joined by curved or arcuate low regions 434 or channels. As shown in FIG. 9, the raised features 532 may be generally rectangular and may gradually transition with an arcuate low region 534 into the adjacent raised feature. Alternately, in still another embodiment rectangular raised features like those in FIG. 9 may alternate with generally flat low regions similar to those in FIG. 7. Each of these embodiments may have raised features of various heights, widths, center-to-center spacing and contact patches as described above. Furthermore, while the embodiments in FIGS. 3-9 show raised features of uniform height, width, and center-to-center distance, the back-side sections are not limited to such configurations. Alternate embodiments may include raised features of differing widths, heights, and center-to-center spacing.

Those skilled in the art will recognize that the present invention can be used in conjunction with substantially any V-ribbed belt made using materials and techniques that are known in the art for the production of V-ribbed belts. In accordance with certain embodiments of the invention, the V-ribbed belt may come in any of several cross-sectional sizes, referred to as (US) PVH, PVJ, PVK, PVL, and PVM, (ISO) PH, PJ, PK, PL, and PM, in ascending order of pitch between the ribs. The front-side, load-carrying, and back-side sections of the V-ribbed belt may be made from elastic compounds, fabrics and cords, using known techniques. The improved back-side section, which is typically an elastic compound, may be molded to provide an outer surface having one of the configurations disclosed herein or a variation thereof.

The improved coefficient of friction resulting from the modified back-side belt configuration was confirmed through comparative testing. First, a plurality of V-ribbed belts having the improved back-side section of the configuration shown in FIG. 3 was manufactured using techniques known in the art. A template having grooves 0.020 in. (0.508 mm) deep by 0.080 in. (2.03 mm) pitch (i.e. the center-to center spacing) was used to manufacture the textured configuration of the belt's back-side section. The resulting raised features on the back-side surface of the V-ribbed belt had a height H of about 0.012 in. (0.304 mm) and a center to center spacing C of about 0.08 in. (2.03 mm). These V-ribbed belts are identified in Tables 1 and 2 below as examples 1-6. Next, a plurality of V-ribbed belts made from the same material as examples 1-6 were manufactured using the same techniques, except that the back-side surface was left flat as shown in FIG. 2. These belts are identified in Tables 1 and 2 below as comparative examples 7-8.

The conventional and improved V-ribbed belts were tested on a flat-faced, back-side pulley to determine the coefficient of friction both at peak and at 10% slip under dry, dust conditions after either 10 or 24 hours in a test chamber following SAE J2432. Peak refers to the static coefficient of friction when the belt is stopped and started. The coefficient of friction at 10% slip refers to the coefficient of friction where the belt experiences 10% slippage at a point between the drive pulley and the back-side pulley. Each belt was tested three times consecutively for each back-side slip test. The results of the tests are reported in Tables 1 and 2 below.

TABLE 1

Coefficient of Friction at Peak: Modified vs. Smooth Surface

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Hours in test chamber | 24 hr | 24 hr | 10 hr | 10 hr | 10 hr | 10 hr | 10 hr | 10 hr |
| Trial 1 | 0.53 | 0.49 | 0.56 | 0.53 | 0.49 | 0.51 | 0.41 | 0.51 |
| Trial 2 | 0.79 | 0.64 | 0.87 | 0.74 | 0.69 | 0.66 | 0.48 | 0.47 |
| Trial 3 | 1.06 | 0.78 | 1.15 | 1.10 | 1.01 | 0.72 | 0.50 | 0.44 |

TABLE 2

Coefficient of Friction at 10% Slip: Modified vs. Smooth Surface

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Hours in test chamber | 24 hr | 24 hr | 10 hr | 10 hr | 10 hr | 10 hr | 10 hr | 10 hr |
| Trial 1 | 0.41 | 0.42 | 0.39 | 0.41 | 0.39 | 0.43 | 0.36 | 0.41 |
| Trial 2 | 0.57 | 0.54 | 0.77 | 0.66 | 0.53 | 0.54 | 0.40 | 0.36 |
| Trial 3 | 0.98 | 0.68 | 1.05 | 1.02 | 0.92 | 0.66 | 0.42 | 0.36 |

With respect to Trial 1, examples 1-6, which used the improved belt, have a slightly higher coefficient of friction on average when compared to examples 7 and 8, which used the conventional belt. Over time, the advantage provided by the modified back-side surface increased as demonstrated by consecutive Trials 2 and 3. With respect to the conventional flat-faced belts in examples 7 and 8, the coefficient of friction remained generally the same for all three consecutive trials. For the improved V-ribbed belts, the coefficient of friction unexpectedly increased significantly in the consecutive trials. Consequently, after continued use, the improved V-ribbed belts provided a substantially higher coefficient of friction than the conventional flat-faced belt.

Having described the invention in detail and by reference to specific embodiments thereof, it will be apparent that numerous modifications and variations are possible without departing from the spirit of the invention as defined by the following claims.

What is claimed:

1. A V-ribbed belt comprising:
    an inner front-side section having a plurality of laterally spaced longitudinally extending V-ribs,
    an outer back-side section for driving a flat-faced pulley, the outer back-side section comprising a plurality of raised features separated by low regions alternating therebetween and extending longitudinally along the length thereof, wherein the raised features and low regions are configured and arranged such that only the apex of the raised features are contactable with the flat-face of the flat-faced pulley; and
    a load-carrying section disposed between said back-side and said front-side sections and coextensive with both the back-side and front-side sections;
    wherein the low regions have a depth of about 0.1 mm to about 1.0 mm and the raised features have a width of about 0.2 mm to about 1.8 mm.

2. The V-ribbed belt of claim 1 wherein the raised features are spaced laterally across the width of the back-side of the V-ribbed belt.

3. The V-ribbed belt of claim 1 wherein a transverse cross-section through the width of at least one of said raised features has an outermost contour that is curved, triangular, or forms plateau.

4. The V-ribbed belt of claim 1 wherein the outer back-side section has a maximum thickness of about 1.3 mm.

5. The V-ribbed belt of claim 1 wherein the raised features have a center-to-center distance of about 0.4 mm to about 3.6 mm.

6. The V-ribbed belt of claim 5 wherein the center-to-center distance between the raised features is uniform across the width of the V-ribbed belt.

7. The V-ribbed belt of claim 1 wherein the raised features form a contact patch with the flat-faced pulley having a reduced area of about 20% to about 50% of the area of a full contact patch and provides an increased coefficient of friction to the outer back-side section.

8. The V-ribbed belt of claim 7 wherein the coefficient of friction of the outer back-side increases over time in dry, dust conditions by about 1.4 to about 2.1 times its initial coefficient of friction measured when the belt is stopped and started.

9. The V-ribbed belt of claim 7 wherein the coefficient of friction of the outer back-side increases over time in dry, dust conditions by about 1.5 to about 2.7 times its initial coefficient of friction at 10% slip.

10. The V-ribbed belt of claim 1 wherein the thickness of the back-side section of the belt including the raised features is about 0.76 mm to about 1.3 mm and the thickness of the front-side section of the belt is about 4.0 mm to about 6.35 mm.

11. The V-ribbed belt of claim 1 wherein the load-carrying section of the belt comprises longitudinally extending load-carrying cords.

12. A V-ribbed belt comprising:
    an inner front-side section having a plurality of laterally spaced longitudinally extending V-ribs,
    an outer back-side section for driving a flat-faced pulley comprising a plurality of raised features that are configured to contact and frictionally engage a flat-faced pulley, the raised features extending longitudinally along the length of the belt and having heights of 0.1 mm to 1.0 mm; and
    a load-carrying section disposed between said back-side and said front-side sections and coextensive with both the back-side and front-side sections.

13. The V-ribbed belt of claim 12 wherein a transverse cross-section through the width of at least one of said raised features has an outermost contour that is curved, triangular, or forms plateau.

14. The V-ribbed belt of claim 12 wherein at least one raised feature is separated from an adjacent raised feature by a longitudinally extending curved or flat bottomed channel.

15. The V-ribbed belt of claim 12 wherein the raised features are spaced laterally across the width of the back-side of the V-ribbed belt.

16. The V-ribbed belt of claim 12 wherein the outer back-side section has a maximum thickness of about 1.3 mm, and the raised features have a center-to-center distance of about 0.4 mm to about 3.6 mm.

17. The V-ribbed belt of claim 16 wherein the center-to-center distance between the raised features is uniform across the width of the V-ribbed belt.

18. The V-ribbed belt of claim 12 wherein the raised features form a contact patch with the flat-faced pulley having a reduced area of about 20% to about 50% of the area of a full contact patch and provides an increased coefficient of friction to the outer back-side section.

19. The V-ribbed belt of claim 18 wherein the coefficient of friction of the outer back-side increases over time in dry, dust conditions by about 1.4 to about 2.1 times its initial coefficient of friction measured when the belt is stopped and started.

20. The V-ribbed belt of claim 18 wherein the coefficient of friction of the outer back-side increases over time in dry, dust conditions by about 1.5 to about 2.7 times its initial coefficient of friction at 10% slip.

21. A V-ribbed belt comprising:
    an inner front-side section having a plurality of laterally spaced longitudinally extending V-ribs,
    an outer back-side section comprising a plurality of raised features separated by low regions alternating therebetween and extending longitudinally along the length thereof; and
    a load-carrying section disposed between said back-side and said front-side sections and coextensive with both the back-side and front-side sections;
    wherein apexes of the raised features form a contact patch when placed against a flat-faced pulley having a reduced area of about 20% to about 50% of the area of a full contact patch and provides an increased coefficient of friction to the outer back-side section;
    wherein the coefficient of friction of the outer back-side increases over time in dry, dust conditions by about 1.4 to about 2.1 times its initial coefficient of friction measured when the belt is stopped and started, or the coefficient of friction of the outer back-side increases over time in dry, dust conditions by about 1.5 to about 2.7 times its initial coefficient of friction at 10% slip.

22. A V-ribbed belt comprising:
    an inner front-side section having a plurality of laterally spaced longitudinally extending V-ribs,
    an outer back-side section for driving a flat-faced pulley comprising a plurality of raised features that are configured to contact and frictionally engage a flat-faced pulley, the raised features extending longitudinally along the length of the belt and having heights of 0.1 mm to 1.0 mm; and a load-carrying section disposed between said back-side and said front-side sections and coextensive with both the back-side and front-side sections;

wherein the raised features form a contact patch with the flat-faced pulley having a reduced area of about 20% to about 50% of the area of a full contact patch and provides an increased coefficient of friction to the outer back-side section;

wherein the coefficient of friction of the outer back-side increases over time in dry, dust conditions by about 1.4 to about 2.1 times its initial coefficient of friction measured when the belt is stopped and started, or the coefficient of friction of the outer back-side increases over time in dry, dust conditions by about 1.5 to about 2.7 times its initial coefficient of friction at 10% slip.

\* \* \* \* \*